United States Patent
Bennett, Jr. et al.

(10) Patent No.: US 8,234,574 B2
(45) Date of Patent: Jul. 31, 2012

(54) METHOD AND SYSTEM FOR NAVIGATING THROUGH A REPOSITORY OF DISPLAYS

(75) Inventors: Carl O. Bennett, Jr., Marietta, GA (US); Flemming Boegelund, Frederikssund (DK); Bruce D. Chatman, Ho-ho-kus, NJ (US); Steven Earl Hicks, Coppel, TX (US)

(73) Assignee: International Business Machines Corporation, Armonk, NY (US)

( * ) Notice: Subject to any disclaimer, the term of this patent is extended or adjusted under 35 U.S.C. 154(b) by 1467 days.

(21) Appl. No.: 10/062,346

(22) Filed: Jan. 31, 2002

(65) Prior Publication Data

US 2003/0142145 A1    Jul. 31, 2003

(51) Int. Cl.
*G06F 3/048* (2006.01)
(52) U.S. Cl. .......................... 715/730; 715/854
(58) Field of Classification Search .................. 715/853, 715/854, 840, 810, 730, 732, 514, 838
See application file for complete search history.

(56) References Cited

U.S. PATENT DOCUMENTS

| | | | |
|---|---|---|---|
| 6,249,281 B1 * | 6/2001 | Chen et al. ..................... | 715/753 |
| 6,842,185 B1 * | 1/2005 | Mavrommati et al. ....... | 715/844 |
| 2002/0049763 A1 * | 4/2002 | Seamon ........................ | 707/100 |
| 2002/0180803 A1 * | 12/2002 | Kaplan et al. ................. | 345/810 |

* cited by examiner

*Primary Examiner* — Namitha Pillai
(74) *Attorney, Agent, or Firm* — Schmeiser, Olsen & Watts; Mark Vallone

(57) ABSTRACT

A method and system enabling a user to navigate through a repository of graphical displays and maintain knowledge of the location of any display in the repository. The navigation enables a user to create a slide presentation by searching, selecting, downloading and compiling slides from a central slide repository. Graphical displays are arranged in a repository in a grid-like configuration such that a list of groups displayed in one direction and the specific displays within that group are listed in another (e.g., perpendicular) direction. These groups of slides are arranged in a set of directories and sub-directories that are linked to each directory. A hierarchy of the display repository displays the particular directory and sub-directory path taken by a user to retrieve any particular graphical display. A user may navigate through the display repository and select displays and determine their location in the display repository.

18 Claims, 7 Drawing Sheets

METHOD AND SYSTEM FOR NAVIGATING THROUGH A REPOSITORY OF DISPLAYS

FIELD OF THE INVENTION

This invention relates to the field of image displays on computer systems and in particular to a method and system for displaying large amounts of display information organized in huge hierarchies. The display of the organizational structure or hierarchies is special in that regardless of the item of information that is currently on the display, that information is also visible at the location where that item of information is stored in the total hierarchy.

BACKGROUND OF THE INVENTION

The use of graphical displays to convey information is an important part of the activities in most businesses and corporations such as those in the mass communication industry. Two such industries, which rely heavily on graphical images, are the journalism industry and the advertising industry. In business, executives make presentations to directors, managers conduct meetings with staff, salespersons make presentations to potential customers, doctors conduct meetings with nurses, lawyers make presentations to juries, and so on. A great many professionals conduct and attend meetings and presentations regularly. Much effort therefore goes into creating and delivering effective presentations and preparing for and conducting effective meetings. In addition to the business world, many individuals use graphical images in communications. Much of the conveying of graphical images occurs through the use of computers and computing networks.

These displays contain information related to the nature of the particular display. The pieces of information can be referred to as objects and can include text, charts, graphs and pictorial images. Each display contains one or more of these objects. Each display contains information about the objects contained on the display. This information includes information about any hotspot (hyperlink) objects contained on the display. This information is created by software during the creation of the display and is stored such that the information is transparent to the user.

In a computing environment, there are many graphical displays that appear on a user's machine. There are countless types of displays in any computing environment and include typical displays such as web pages and presentation slides. The challenge of enabling users to search through these displays to find the particular information that they desire increases as the amount of information available increases. No matter whether the information resides on a user's local computer or if the user is accessing the information via a computing network, the same need arises regarding improved tools to help navigate in large amounts of information. A good example of large amounts of information brought together and made available to everyone is the World Wide Web.

The World Wide Web, also referred to as the Internet, is a global computing environment in which all information (text, images, audio, video, computational services) that is accessible from the Internet can be accessed in a consistent and simple way by using a standard set of naming and access conventions. Internet users can access computing sites all over the world. A user can connect from his/her machine to thousands of Web servers simply by "clicking" on an image or by entering a specific address. Users can connect to many different types of systems and not be aware of the system differences. Users can also access many different types of information such as text, images, audio, video and computational services. The user can perform all of these tasks using a single web-browser that can access this information. The ability to access information via the Internet is the result of hyperlinks that connect this seemingly infinite body of information together. A hyperlink is text or an image in a web site that can be accessed in order to have some action performed. During this process of accessing a hyperlink, the user typically moves a pointing device such as a mouse over certain areas referred to as hotspots, and then clicks the mouse to signal the initialization of the desired action.

When a user is performing this exercise on the internet, the user may often find him or herself in a situation where they feel lost in the midst of a hierarchy of web pages. After clicking multiple times on a number of hotspots with hyperlinks the user may end up at some location that is unknown to the user. In addition, the user may not know how to get back to the original starting point. Many users may identity this experience. Along the way when repeatedly clicking hotspots on the screen, the user will pass through pages where the graphical look and feel and colors of the display remain constant. The look, feel and colors all comprise the 'image' for one website. Then the user will click on and get pages with a different look, indicating that they have gotten into another website. The transfer from on site to another site is transparent to the user, and sometimes not desired. Under all circumstances the tour taken is following a path of some nature of randomness, and certainly without any visibility of a hierarchy. The experience and feeling of getting lost is very likely to happen any time a person spends 5 minutes on the internet.

A Web Browser usually provides a user with the ability to use a 'Back' button that takes the user back to the previous screen. However, it is possible for some web applications or web pages to disable that 'Back' button. Furthermore, the back button may be the only means a user has to prevent getting lost during the search for information.

The WWW is heavily based on using the 'Back' button in the navigation process. The use of the 'Back'-button is more a consequence of 'ease of information development' rather than is it desired from an end user 'navigational ease of use' point of view. In navigation the user should always go forward, never go back. Going back is non productive and waste of time. However, many users have gotten accustom going back and therefore they may not imagine anything else.

To really design for navigation takes a lot more than basic text editing. With basic text editing you are able to produce a 'web' of pages that link to one another. The original WWW in the very early days grew out of basic text editing. The need also arose to create navigational menus, which could also be done in smaller systems by basic text editing. The need for these navigational menus contributed to the introduction of frames in Web Browsers. Frames allow a menu residing in a frame to stay visible on the screen after the user selects an item on the menu that will cause some new informational document appear in another frame in the same window. However the direction of internet technology has moved slightly away from frames as it is not possible for a user to bookmark specific information found in a frame and have the context of the other frames book marked simultaneously. Most recent implementations of web applications tend to work without frames but still implement the menu kind of functionality provided by frames. The result appears, to the user, as if the document has inside knowledge about the hierarchical structure above the document. Some applications are even so clever that they can distinguish which navigation path the user took to get down to the document. This procedure is useful in cases where one particular document may reside multiple places in a menu hierarchy. This is very different from navigation in a file system on a computer disk where the documents are physical, while in menu hierarchies menu items are only imaginary documents implemented as pointers to physical documents.

The described principle of avoiding use of frames has the non-appealing and to the user maybe surprising effect that the entire window is refreshed including the menu when the user selects a menu item. Another disadvantage of this method is that it takes extra time to refresh the entire screen including the menus on the screen.

In the described way the 'web' of pages and documents, on the internet have become more and more structured over the years. Tools became available to create menus in hierarchies and a lot of other things making the non technical web editor able to take advantage of animation and more and more other facilities provided by web browsers, the web browsers themselves also becoming more and more advanced. Lotus Notes and Domino from Lotus Development Corporation are examples of tools that provide structure, in terms of menus and views, both for use with web technology and for use as applications running on a local computer.

Slide presentations are one area where it is desirable to navigate through a large volume of slides another to select slide for a presentation. However traditional slide presentations tend to be individual files with poor integration between multiple presentations. For example there is not much possibility to navigate in traditional slide presentations, like a hotspot on one slide in one presentation can take the user to another slide in another presentation. Traditional slide presentations tend to be prepared for a sequential walk through from the first slide to the last slide.

Even with the developments in this technology, there remains a need for a method and system that can enable a user to navigate in a well organized hierarchical graphical display repository looking for information for various purposes, but maintain the visibility of the overall hierarchical structure at any given instant.

SUMMARY OF THE INVENTION

It is an objective of the present invention to provide a method and system to search for graphical displays contained in a repository of graphical displays.

It is a second objective of the present invention to provide a method and system to determine the location of specific location of a display stored in a display repository.

It is a third objective of the present invention to provide a method and system to store graphical displays in a repository such that the location of a specific display in the repository can be easily determined.

It is a fourth objective of the present invention to provide a graphical display storage method and system such that a user can easily locate displays stored according to such method and system.

It is a fifth objective of the present invention to provide a method and system that to enable a user to navigate through a repository of displays and maintain knowledge of the location of any display currently being viewed by the user.

The present invention provides a method and system to enable a user to navigate through a repository of graphical displays and maintain the knowledge of the location of any display in the repository at any time. The purpose of the navigation activity could be to enable a user to create a slide presentation by searching, selecting, downloading and compiling slides from a central slide repository located on a computing network. A user may want to give a presentation on content that is currently on a computing network location such as a web site on the internet. The user may not feel comfortable talking about the enormous number of slides that the site might have on a particular subject. Therefore, the user would need to review the slides and select particular slides for the presentation. This review process would require a user to search through the numerous slides in the repository. This task could be tedious and would require the user to track the reviewed slides and the path of the search and review.

The present invention is a method and system for navigating through a repository of graphical displays in which the displays are stored in a specific group and in a specific sequence in that group. The displays are stored such each group of displays has a specific identity and a specific location in the repository. In addition, each display in the group is identified by a specific location on the identified group where the display belongs. For any display, the group information and the specific location information would available to the user during the navigation. As a result of the knowledge of the group and sequence location, a user could determine a location of a display in the repository.

The method of the present invention provides a user with the ability to navigate through a presentation slide repository, download selected slides and convert these slides into a format of a presentation slide program such as PowerPoint®. In this method, the navigation and download slide steps can be performed in a browser environment. The conversion step can be performed with software located in the user machine.

This invention introduces the idea that the 'Back' button (to a great extent) should never be used within a website where the invention is implemented. When clicking a hotspot that takes the user out of this structured web site a new browser window is opened leaving the option for the new (unstructured) web-site to take you where it wants, but leaving the structured website available for you where you left it.

Another important aspect of this invention is that you can get an impression of the target page for a hotspot without taking the time to click and go there. The idea is that a thumbnail image of the target screen pops up when the mouse is moved over the hotspot. This is saving time. It is especially useful when a person is looking for some information that he has seen before and he wants to visually recognize the information before taking the time to going there. Imagine that there are 64 hotspots or buttons on a page that have pop up thumbnails like described. A person can quickly move the mouse over them and find what he is looking for.

This invention provides other key features that are not present in similar tools. First of all it helps the user avoid getting lost in information. Secondly the invention integrates multiple presentations, providing navigational links from any presentation slide to any presentation slide as defined during slide development, which the traditional presentation tools do not. These characteristics are further described in the following.

While reading detailed content, it is at all times visible where the user is in the overall structure. The user can get to any other content by directly going there without needing to climb up a hierarchy, or to use the 'Back' button. This invention provides navigation by visual recognition of graphics popping up instead of (only) text strings on menus or in the body of a document. The invention uses a so called 'main navigator window'. This kind of window is also widely known by the term 'site map'. The name site map is inherited from the internet which is based on internet sites, each with it's own unique address. The main navigator window displays only structure, no informational content. The structure displayed is hierarchical menu structure in which the user can open sub-structures several times and get down to the lowest level. This process is similar to opening sub-folders in a file system on a disk of a computer.

At the lowest level of the main navigator the user can select a menu item that opens a new window with a two-dimensional structure that provides direct access to a thousand documents or any other number that the window may be designed for. The invention is based on this two-dimensional navigation functionality. The invention is also based on the combination of the two-dimensional window in combination with the main navigator and in combination with visual recognition of pop-up graphics for other documents, before actually taking time to open these documents and in combination with the fact that the 'back button' of the browser or in general the computer application is intended to not be used.

Instead of the main navigator and the two-dimensional navigation structure being two different windows, there may be two different frames in the same window, or there may be techniques to avoid frames as described earlier, meaning that they may be precompiled into each detailed document itself or they may be compiled together at run time, i.e. the time where the user actually selects to read a detailed document. The two-dimensional navigation structure has especially been developed for organizing presentations, and presenting slides. However considering one presentation slide representing one document, the navigation techniques apply to any type of document.

With specialized software, conventional personal computers provide effective platforms for creating graphical displays for use in a variety of applications. One primary application of graphical displays is in conducting meetings and delivering presentations. In this application, graphical displays in the form of presentation slides are used to convey information. Currently available slide presentation program modules can turn a personal computer into a customized presentation system for creating and delivering slide presentations. Generally described, these presentation systems provide a specially designed, user-friendly, pallet of tools to assist in the creation of presentation slides to be subsequently displayed to an audience. These presentation systems also allow the slides to be sequentially presented to an audience, point-by-point and slide-by-slide, with color, animation, audio, and transition effects that enrich and enliven the presentation.

This invention represents a user interface where individual presentation slides have become their own document entities, while the presentation tools consider one presentation with multiple slides the smallest document entity. With this invention the slide displays may be part of a larger set of displays. For example, a user can assume that a server stores a repository of 1,000,000 PowerPoint slides previously exported from PowerPoint into the JPEG graphical images format. This invention allows for structured navigation in such repositories of slides. In general slides could be referred to as 'documents'.

DETAILED DESCRIPTION OF THE INVENTION

Figure 1:
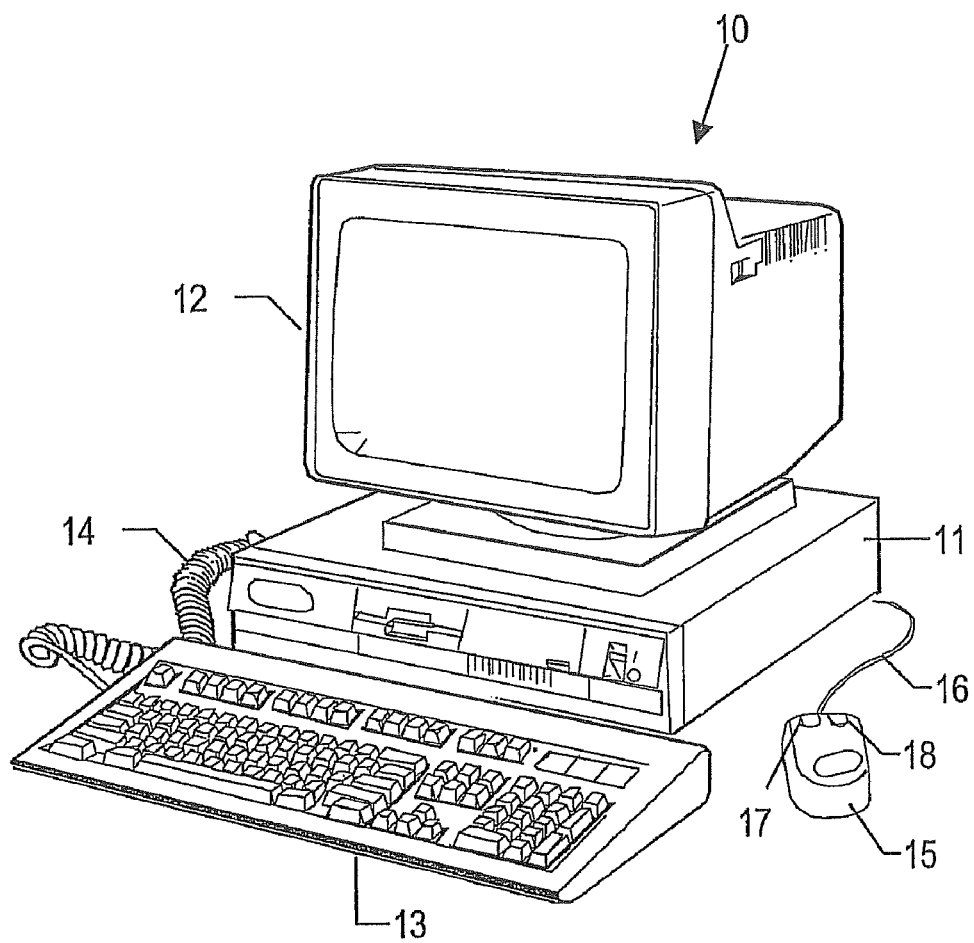
FIG. 1 depicts data processing equipment a system that can be utilized to implement the present invention.

In accordance with the present invention, a slide presentation program executes on a computer, preferably a general-purpose personal computer. FIG. 1 and the following discussion are intended to provide a brief, general description of a suitable computing environment in which the invention may be implemented. With reference now to FIG. 1, there is depicted a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The personal computer may operate in a networked environment using logical connections to one or more remote computers, such as a remote computer. The remote computer may be another personal computer, a server, a router, a network PC, a peer device or other common network node, and typically includes many or all of the elements relative to a conventional personal computer. The logical connections depicted include a local area network (LAN) and a wide area network (WAN), Such networking environments are commonplace in offices, enterprise-wide computer networks, intranets and the Internet.

As mentioned, the method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
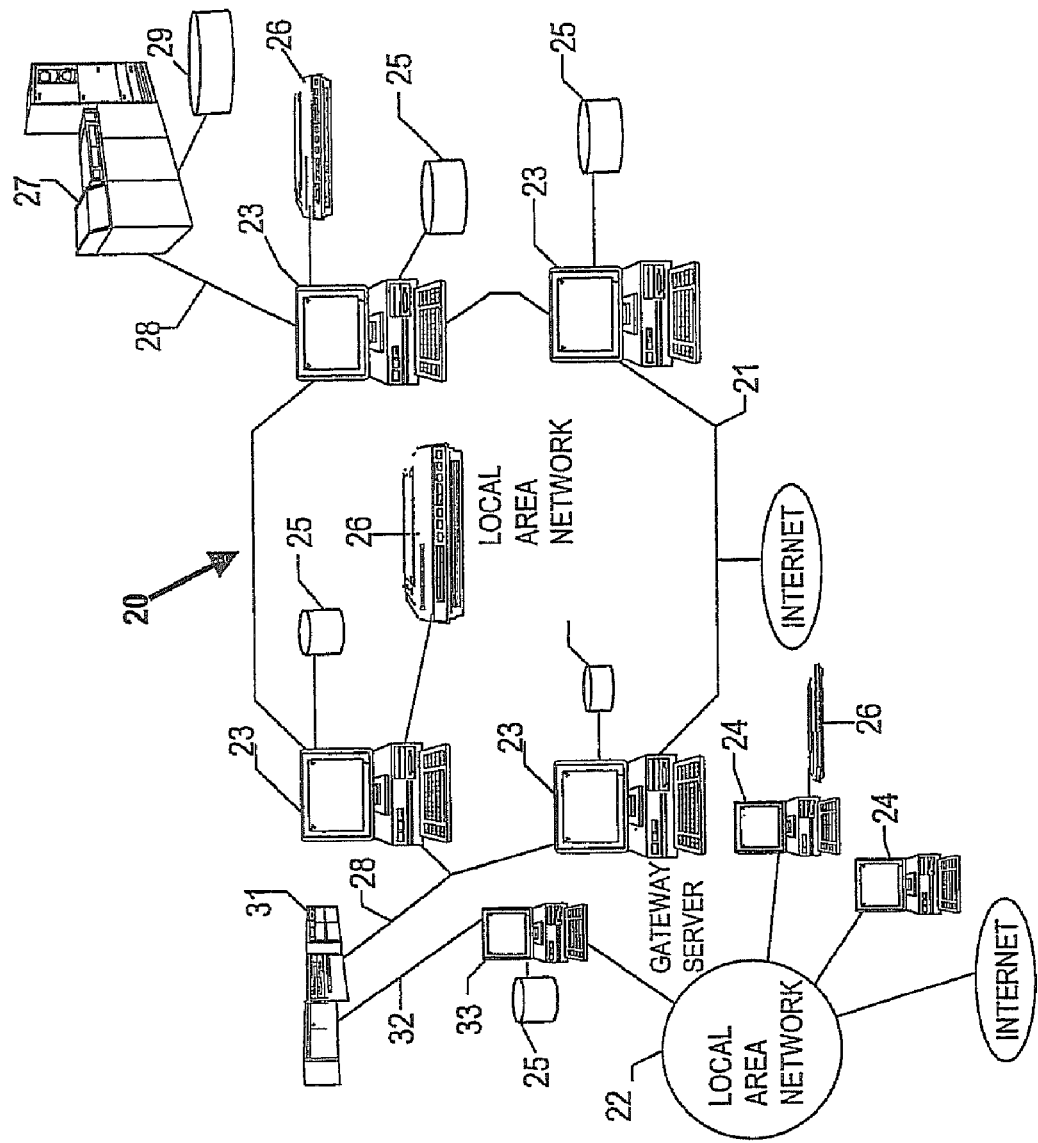
FIG. 2 is a diagram of a computer network over which messages and transactions may be transmitted.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS) that serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3:
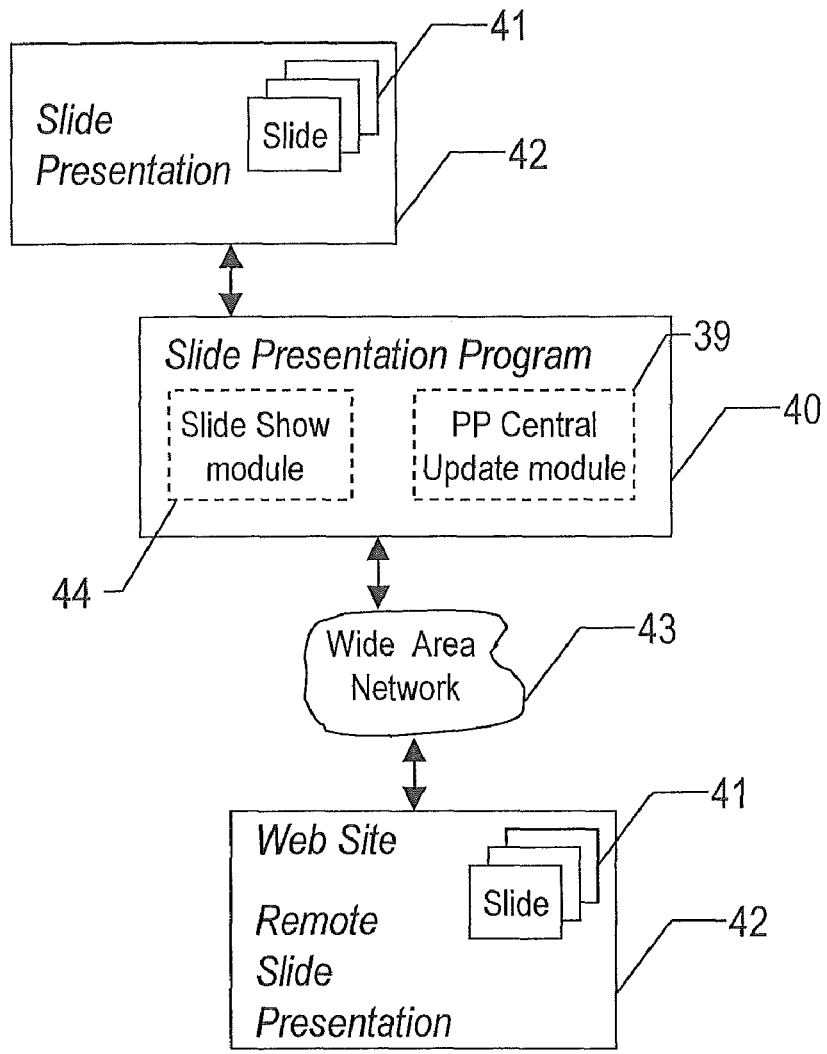
FIG. 3 is a diagram of the architecture of a typical slide presentation program.

Although the present invention can apply to the search for any type of display, the techniques of this invention will be described in the context of slide presentations. Referring first to FIG. 3, there is an illustration of an architecture of a slide presentation program 40 that can be used in conjunction with the present invention. A slide is a discreet collection of information, including visual information such as text, graphic images, video, or animation. A slide may also comprise other information, including sounds and interactive information, such as hyperlinks. The slide presentation program 40 provides an author with the ability to create and edit a set of one or more "slides" 41 and to "present" or display one or more of the set of slides. The set of slides is referred to as a "slide presentation" 42. A slide presentation 42 is generally stored on a computer storage medium, such as a disk drive. The computer storage medium may be directly connected to the computer that performs a sideshow, or it may be connected to a remote computer on a local area network (LAN) or a wide area network (WAN) 43, such as the Internet.

The slide presentation program 40 includes a slide show module 44 that contains program code for controlling an electronic slide show. During an electronic slide show, the slide show module 44 retrieves a slide 41 and displays the slide on an output medium, such as a display monitor. The slide presentation program 40 also includes a PPCentral update module 39 that controls updating of the Central slide presentation 42. The techniques and features of the present invention could be located in the Central update module 39.

Figure 4:
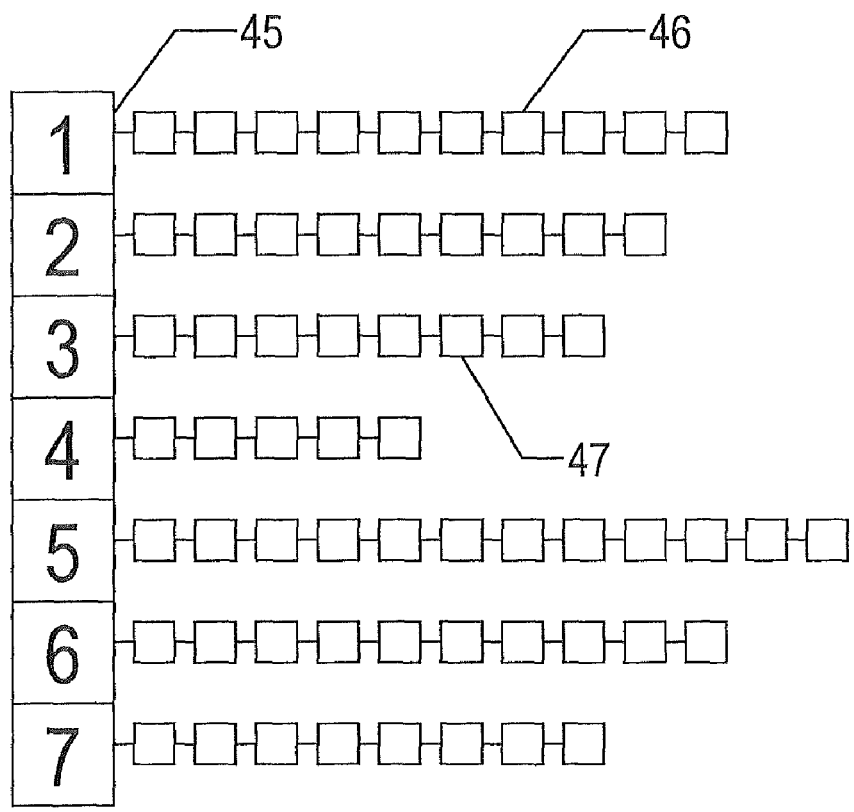
FIG. 4 is a diagram of a configuration of displays stored in a repository in accordance with the present invention.

FIG. 4 illustrates a storage configuration for slide presentation in a slide repository that will enable a user to navigate through the slide repository in accordance with techniques of the present invention. As shown, this configuration is a grid-type configuration that has a column 45 containing sets of slide presentations. Each slide presentation will have an identifier that points to a specific location in the repository. The illustration in FIG. 4 shows seven different slide presentations. Each slide presentation contains several slides 46. These slides are stored sequentially in the order that they would appear during an actual slide presentation. As shown, the number of slides in each presentation will vary. In addition, each slide will have an identifier that will indicate the slide presentation in which that slide belongs and the number of that slide in the sequence of slides in that presentation. In FIG. 4, slide 47 is the sixth slide in the third slide presentation. Therefore, this slide could have an identifier that has two fields to identify the particular slide. One field could contain a 3 indicating the third slide presentation. A second field could contain a 6 indicating the sixth slide in that presentation. Although each slide would some type of identifier, this information would generally not be accessible to the user.

Figure 5:
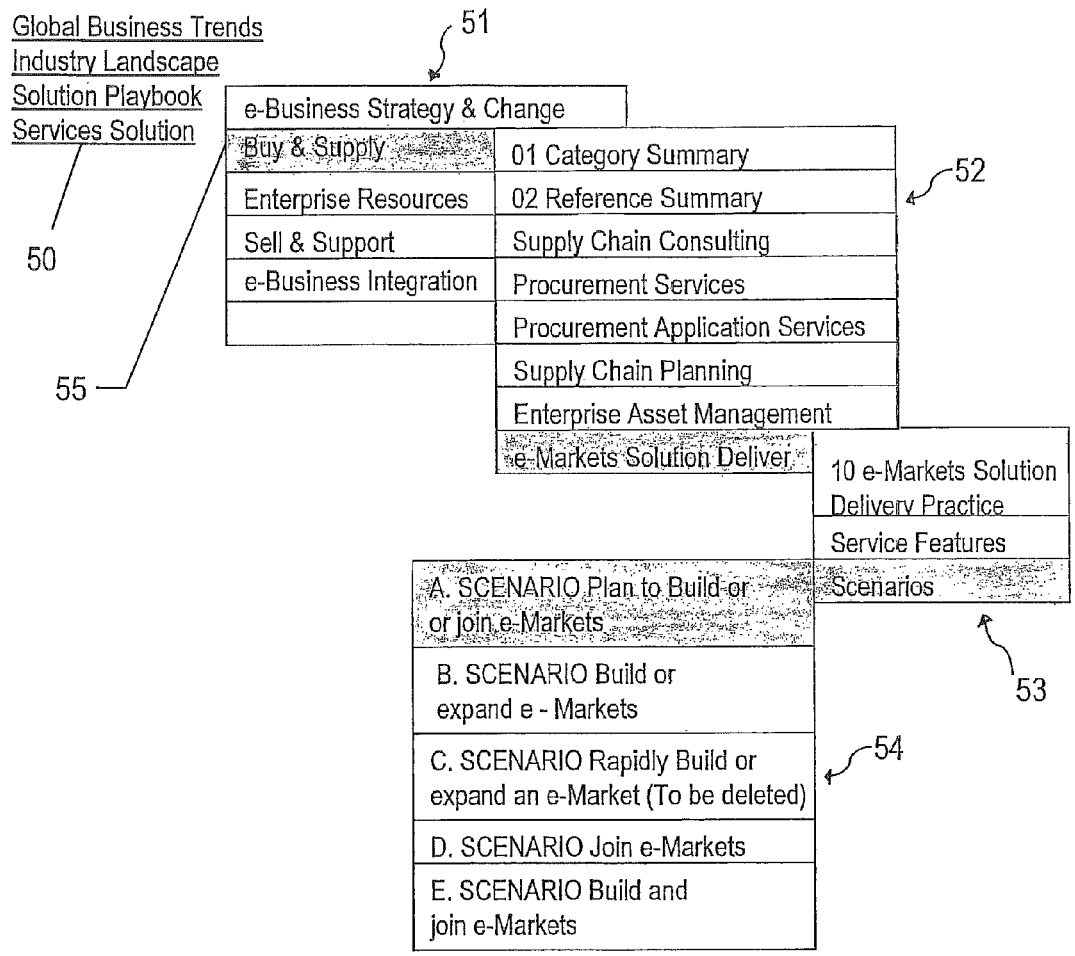
FIG. 5 is an illustration of a display repository directory.

FIG. 5 shows a hierarchical configuration of a repository containing graphical displays. The creation of this storage repository hierarchy along with the actual storage configuration of the slides is further described in disclosure Ser. No. 10/031,417, the contents of which are incorporated herein by reference. As shown, this hierarchical configuration has a main folder 50. This folder contains the highest level of display categories. The displays in the repository fall under one of the folder categories. Each folder has a directory 51 with entries that describe the display categories. In this hierarchy, each entry in the main directory 51 contains a set of sub-directories 52. Each of these sub-directories contains a sub-directory 53. In FIG. 5, sub-directory 53 contains entries that are display set categories. These categories 54 are the locations for sets of displays. Each display in a set contains multiple graphical displays. Each set of displays may be a display set that includes a set of slides.

Referring to the main folder 50, display category 55 has the title "Buy & Supply". The display categories are actually directories. Each directory has links to a set of sub-directories. A directory can have fields containing pointers to the various sub-directories under that directory. For example, the "Buy & Supply" sub-directory 55 links to eight sub-directories 52. These sub-directories have various titles that describe the contents of these sub-directories. Selecting the sub-directory titled "e-Markets Solution Delivery" has links to yet another set of three sub-directories 53. In this particular illustration, by selecting one of the entries in the last set of sub-directories 54, the user has reached the lowest point of the sub-directory hierarchy. At this point, the user can access particular slide presentations related to the topic described in the sub-directory title. The user will be able to select and view a graphical display. In this configuration, some sub-directories will more sub-directories than other sub-directories. The number of directories and sub-directories will depend on the number graphical displays for the topics under that general directory topic. The actual sets of graphical displays will be located at the end of the sub-directory string for the particular directory.

Figure 6:
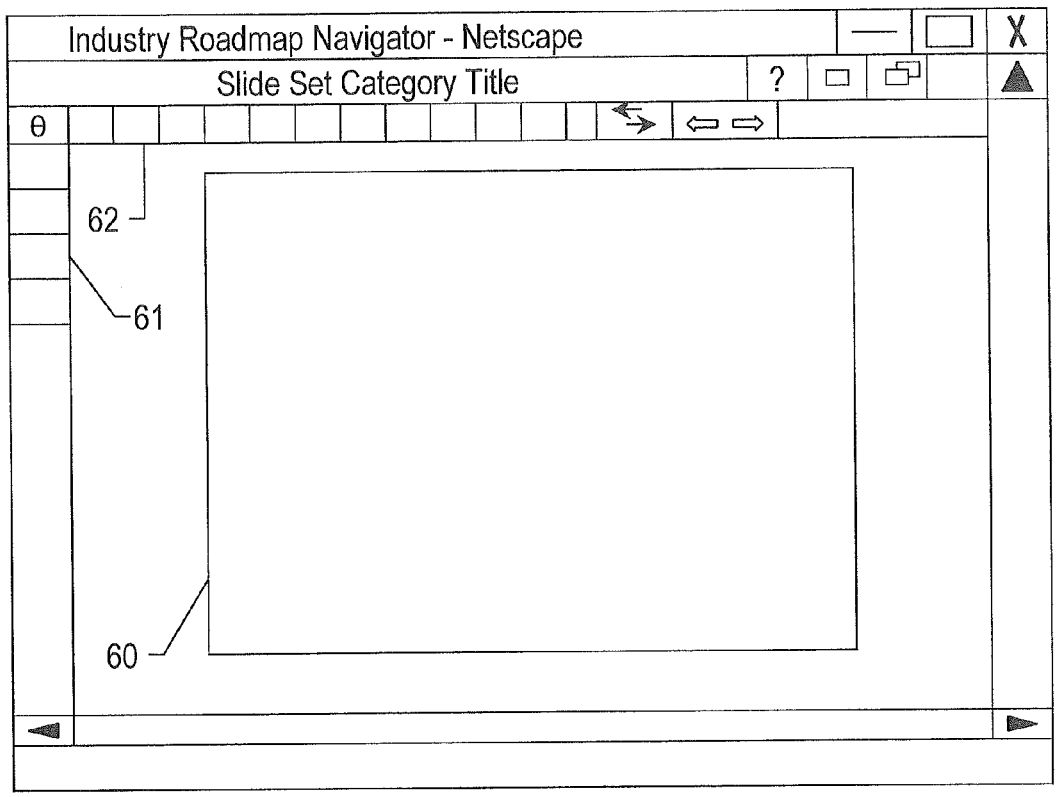
FIG. 6 is an illustration of an actual display stored in a repository according the present invention.

FIG. 6 shows an actual graphical display in accordance with the present invention. As shown the display contains substantive information 60. However, the display also contains vertical control buttons 61 and horizontal control buttons 62 that will enable a user to select a display for viewing. With these sets of buttons, a user can move from display to display by clicking the particular buttons. The vertical buttons control the selection of the display presentation such as a slide presentation. The horizontal buttons control the selection of a particular display in the presentation.

Figure 7:
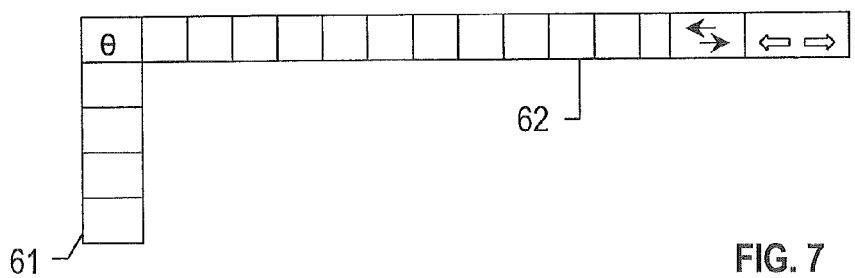
FIG. 7 is a diagram of the navigating display used during the navigation through the display repository.

FIG. 7 shows the particular vertical and horizontal controls that appear on each display that enable a user to search through and select a particular slide. As shown, there is a column of buttons 61 that correspond to the number of slide presentations in a particular sub-directory. A row of buttons 62 corresponds to the number of slides in a particular slide presentation. Referring to FIG. 4, there would be seven buttons in the column indicating seven slide presentations in this sub-directory. For the third slide presentation, there would be 8 buttons in the row 62. Each button would correspond to the particular slide in the sequence. If the user wanted to view the sixth slide 47, the user could click the sixth button and this sixth slide would appear on the display. If the user wants to view another slide on a different presentation, the user can click the button in the column for that particular presentation and then click the button in the row that corresponds to the particular slide, which the user wants to view. The buttons corresponding to the slide presentation and the specific slide will be lit to indicate to the user the actual slide that the user is viewing.

Figure 8:
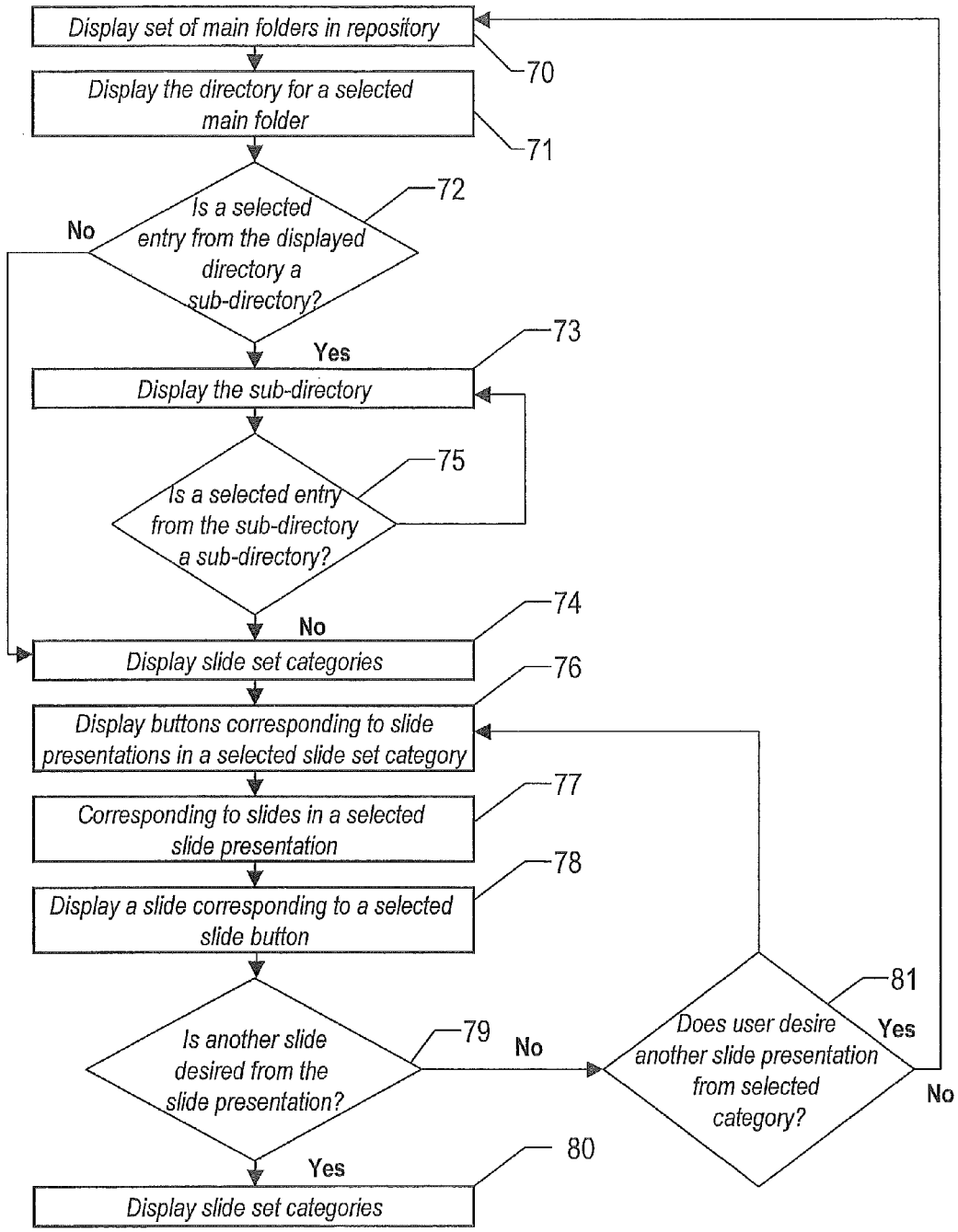
FIG. 8 is a flow diagram of the steps in the implementation of the method of the present invention.

FIG. 8 illustrates the steps involved in navigating through the slide repository and selecting and viewing a particular slide. The initial step 70 is to display the set of main folders that are at the top of the hierarchy. A user viewing the display of folders can move the curser over each folder. As the curser moves over the folder, the directory for that folder is displayed as a pop-up image. Step 71 displays the directory from the folder selected by the user. Again, as the user moves the curser over the entries in the directory, the sub-directory for that entry is displayed. This sub-directory can contain another sub-directory or there could be a list of display categories. Step 72 determines whether the entries in the directory link to a sub-directory or the list of display categories. If the link is to another sub-directory, that sub-directory is displayed in step 73. If the link in the sub-directory is not to a sub-directory, then that link is to a list of display categories. The construction of the display repository is such that a list of display categories is at the end of the repository directory hierarchy. At the end of a path of directories and sub-directories is the list of display categories. A "no" in step 72 indicates that this is the end of the sub-directory hierarchy and therefore there is a list of display categories. If step 72 determines that the end of the directory path has been reached, the next step 74 would be to display the list of display categories.

Referring back to step 73, which displays the entries in a sub-directory, if the user selects an entry, there is another determine in step 75 whether the selected entry links to another sub-directory or to a list of display categories. This step is similar to step 72 except, step 75 makes the determination between two sub-directories and step 72 makes the determination between the initial directory and an initial sub-directory. If the determination in step 72 is that there is another in this sub-directory for an entry in the present sub-directory links to another sub-directory. If the determination in step 75 is that there are no more sub-directories, the user has reached the end of the directory hierarchy and that there is a list of display categories for entry in this last sub-directory. At each selection step, the entries in a directory or sub-directory will pop-up prior to the user making a selection.

As previously mentioned, step 74 displays to list of display categories. At this point, the user can select one of the categories from the display. Step 76 will show the different sets of displays for this display category. Referring back to FIG. 5, "Scenario Plan to Build or Join e-Markets" is a category in the list of display categories. This one category can contain several display presentations. This display will be similar to FIG. 6. The display will contain a vertical row of buttons and a horizontal row of buttons. Each button in the vertical corresponding to a display presentation and each button in the horizontal corresponding to display in the particular presentation indicated by a selected vertical button. Typically, an initial display for a selected display category will show the first display of the first presentation. The user can then use the vertical and horizontal rows of buttons to navigate through that list display categories.

Once the user selects a particular display presentation, step 77 will display a horizontal row of buttons corresponding to the number of displays in that particular display presentation. While in a particular presentation, as the user moves the curser over a particular horizontal button, a thumbnail of that display will appear. A user can view the entire set of displays by simply moving the curser over the horizontal row and reviewing the thumbnail images. To view the display in full size the user can click the horizontal button corresponding to the desired display and the full size display will appear as illustrated in step 78. After the user has viewed one display, step 79 allows the user to have option of selecting another display to view. If the user wants to view another display on the same display presentation, the user selects the display in step 80 by clicking another horizontal button. After the user has made the selection, the new display will appear on the screen.

The real advantage of the present invention is seen when user wants to view displays in another presentation. This situation will occur when the determination in step 79 is that the user wants to view displays from another presentation. The user has the option of selecting another display presentation from the set of presentations without back scrolling using the "Back" button on the display screen. This ability provides new techniques for navigating through the repository of displays. The can user the vertical buttons to view and select a new display presentation to view. As the curser moves over the vertical row of buttons, the thumbnail of the first display in each presentation appears on the screen. This first display often gives the title or description of the presentation. The user can make a determination about interest in viewing that display presentation by view the thumbnail of the initial display. If the user determines that they want to view another display presentation, the method moves to steps 81 and back to step 76 where the horizontal buttons for the newly selected presentation appear on the display screen. If in step 81, the user wants to search for or view displays from another category of display presentations regardless where this new category is in the repository, the can return to step 70 with the need to back track through the path initially taken to get to the location in the repository of the presently viewed display.

As stated, there are several advantages of the method of this invention over the prior navigation systems. In addition, if the user just wants to view the location in the in the repository of the presently viewed displays, the user can click the "X" on the display screen and return to the hierarchy display in FIG. 5. The user can then return to the location of the presently viewed display be clicking the location of the hierarchical display that is the location of the presently viewed displays. Another feature of the present invention is that the path taken by the user to reach the location of the presently viewed displays from steps 70 to 76 is highlighted on the hierarchical display in FIG. 5. With this invention, a user can quickly determine the location in the repository of a display or display presentation. The user can also access any display with relative ease and speed. The thumbnail display feature also enables a user to quickly scan and view a series of displays without bring up each individual display.

It is important to note that while this invention was described in the context of slides as displays and slide presentations as display presentations, the navigations concepts and techniques of this invention can apply to any graphical displays stored in a repository in the configuration of a display repository illustrated in the present invention. It is also important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include physically tangible storage devices such as EPROM, ROM, tape, paper, floppy disc, hard disk drive, RAM, and CD-ROMs.

Having thus described the invention, what we claims as new and desire to secure by Letters Patent is set forth in the following claims.

We claim:

1. A method for navigating through a repository of graphical displays and maintaining knowledge of the location of any display currently being viewed, said method comprising:

displaying on a display screen a main folder of a plurality of directories in the repository from which a user can select one of the directories to navigate through to review graphical displays, the directories of the plurality of directories being simultaneously displayed as text that identifies each directory, each directory being linked to a hierarchy of subdirectories;

responsive to selection of a directory of the simultaneously displayed directories and to a navigation along a displayed subdirectory path through the hierarchy of subdirectories to which the selected directory is linked such that the navigation ends with selection of a last subdirectory of the subdirectory path, simultaneously displaying on the display screen display categories, each display category being displayed and identified as text consisting of a title of a corresponding subdirectory of the last subdirectory, each display category comprising display sets, each display set including a set of slides;

responsive to selection of a display category of the simultaneously displayed display categories, displaying a first row of buttons in a viewing screen for the selected display category, wherein each button in the first row of buttons corresponds to a different display set of the display sets in the selected display category such that each display set is represented by a different button in the first row of buttons;

responsive to selection of a first button in the first row of buttons, displaying in the viewing screen a second row of buttons simultaneous with the displayed first row of buttons, wherein each button in the second row of buttons corresponds to a different slide of the set of slides in the display set selected via selection of the first button in the first row of buttons;

responsive to selection of a second button in the second row of buttons corresponding to the selected first button, displaying in the viewing screen the slide corresponding to the selected second button simultaneous with the displayed first row of buttons and the displayed second row of buttons.

2. The method of claim 1, said first row of buttons being located within a first fixed portion of the viewing screen, said second row of buttons being located within a second fixed portion of the viewing screen, said second fixed portion of the viewing screen being independent of which button in the first row of buttons is selected.

3. The method of claim 1, wherein a totality of rows of buttons displayed in the viewing screen only in response to said selection of the display category and said selection of the first button consists of the first row of buttons and the second row of buttons.

4. The method of claim 1, said method further comprising:

responsive to said selection of the second button, lighting the first button and the second button in the viewing screen.

5. The method of claim 1, wherein the first row of buttons and the second row of buttons are oriented perpendicular to each other while being simultaneously displayed in the viewing screen.

6. The method of claim 1, wherein said displaying the second row of buttons in response to said selection of the first button consists of displaying in the viewing screen only the second row of buttons in addition to what is displayed immediately before the first button is selected.

7. A computer program product, comprising a computer readable physically tangible storage device having instructions stored therein, said instructions which upon being executed by a processor of a data processing system implement a method for navigating through a repository of graphical displays and maintaining knowledge of the location of any display currently being viewed, said method comprising:

displaying on a display screen a main folder of a plurality of directories in the repository from which a user can select one of the directories to navigate through to review graphical displays, the directories of the plurality of directories being simultaneously displayed as text that identifies each directory, each directory being linked to a hierarchy of subdirectories;

responsive to selection of a directory of the simultaneously displayed directories and to a navigation along a displayed subdirectory path through the hierarchy of subdirectories to which the selected directory is linked such that the navigation ends with selection of a last subdirectory of the subdirectory path, simultaneously displaying on the display screen display categories, each display category being displayed and identified as text consisting of a title of a corresponding subdirectory of the last subdirectory, each display category comprising display sets, each display set including a set of slides;

responsive to selection of a display category of the simultaneously displayed display categories, displaying a first row of buttons in a viewing screen for the selected display category, wherein each button in the first row of buttons corresponds to a different display set of the display sets in the selected display category such that each display set is represented by a different button in the first row of buttons;

responsive to selection of a first button in the first row of buttons, displaying in the viewing screen a second row of buttons simultaneous with the displayed first row of buttons, wherein each button in the second row of buttons corresponds to a different slide of the set of slides in the display set selected via selection of the first button in the first row of buttons;

responsive to selection of a second button in the second row of buttons corresponding to the selected first button, displaying in the viewing screen the slide corresponding to the selected second button simultaneous with the displayed first row of buttons and the displayed second row of buttons.

8. The computer program product of claim 7,
said first row of buttons being located within a first fixed portion of the viewing screen,
said second row of buttons being located within a second fixed portion of the viewing screen,
said second fixed portion of the viewing screen being independent of which button in the first row of buttons is selected.

9. The computer program product of claim 7, wherein a totality of rows of buttons displayed in the viewing screen only in response to said selection of the display category and said selection of the first button consists of the first row of buttons and the second row of buttons.

10. The computer program product of claim 7, said method further comprising:
responsive to said selection of the second button, lighting the first button and the second button in the viewing screen.

11. The computer program product of claim 7, wherein the first row of buttons and the second row of buttons are oriented perpendicular to each other while being simultaneously displayed in the viewing screen.

12. The computer program product of claim 7, wherein said displaying the second row of buttons in response to said selection of the first button consists of displaying in the viewing screen only the second row of buttons in addition to what is displayed immediately before the first button is selected.

13. A data processing system comprising a processor and a computer readable physically tangible storage device coupled to the processor, said storage device containing instructions which upon being executed by the processor implement a method for navigating through a repository of graphical displays and maintaining knowledge of the location of any display currently being viewed, said method comprising:
displaying on a display screen a main folder of a plurality of directories in the repository from which a user can select one of the directories to navigate through to review graphical displays, the directories of the plurality of directories being simultaneously displayed as text that identifies each directory, each directory being linked to a hierarchy of subdirectories;

responsive to selection of a directory of the simultaneously displayed directories and to a navigation along a displayed subdirectory path through the hierarchy of subdirectories to which the selected directory is linked such that the navigation ends with selection of a last subdirectory of the subdirectory path, simultaneously displaying on the display screen display categories, each display category being displayed and identified as text consisting of a title of a corresponding subdirectory of the last subdirectory, each display category comprising display sets, each display set including a set of slides;

responsive to selection of a display category of the simultaneously displayed display categories, displaying a first row of buttons in a viewing screen for the selected display category, wherein each button in the first row of buttons corresponds to a different display set of the display sets in the selected display category such that each display set is represented by a different button in the first row of buttons;

responsive to selection of a first button in the first row of buttons, displaying in the viewing screen a second row of buttons simultaneous with the displayed first row of buttons, wherein each button in the second row of buttons corresponds to a different slide of the set of slides in the display set selected via selection of the first button in the first row of buttons;

responsive to selection of a second button in the second row of buttons corresponding to the selected first button, displaying in the viewing screen the slide corresponding to the selected second button simultaneous with the displayed first row of buttons and the displayed second row of buttons.

14. The data processing system of claim 13,
said first row of buttons being located within a first fixed portion of the viewing screen,
said second row of buttons being located within a second fixed portion of the viewing screen,
said second fixed portion of the viewing screen being independent of which button in the first row of buttons is selected.

15. The data processing system of claim 13, wherein a totality of rows of buttons displayed in the viewing screen only in response to said selection of the display category and said selection of the first button consists of the first row of buttons and the second row of buttons.

16. The data processing system of claim 13, said method further comprising:
responsive to said selection of the second button, lighting the first button and the second button in the viewing screen.

17. The data processing system of claim 13, wherein the first row of buttons and the second row of buttons are oriented perpendicular to each other while being simultaneously displayed in the viewing screen.

18. The data processing system of claim 13, wherein said displaying the second row of buttons in response to said selection of the first button consists of displaying in the viewing screen only the second row of buttons in addition to what is displayed immediately before the first button is selected.

* * * * *